United States Patent
Moravec et al.

(10) Patent No.: US 9,945,417 B2
(45) Date of Patent: Apr. 17, 2018

(54) METHOD FOR CORRECTING VARIATIONS OF PARAMETERS OF COMPONENTS AND/OR OF ASSEMBLY OF ACTIVE MAGNETIC BEARING AND ACTIVE MAGNETIC BEARING FOR BEARING ROTATING WORKING MEANS

(71) Applicants: Milan Moravec, Usti nad Orlici (CZ); Miroslav Stusak, Chocen (CZ); Jiri Sloupensky, Chocen (CZ)

(72) Inventors: Milan Moravec, Usti nad Orlici (CZ); Miroslav Stusak, Chocen (CZ); Jiri Sloupensky, Chocen (CZ)

(73) Assignee: RIETER CZ S.R.O. (CZ)

( * ) Notice: Subject to any disclaimer, the term of this patent is extended or adjusted under 35 U.S.C. 154(b) by 1078 days.

(21) Appl. No.: 14/199,593

(22) Filed: Mar. 6, 2014

(65) Prior Publication Data

US 2014/0285046 A1    Sep. 25, 2014

(30) Foreign Application Priority Data

Mar. 22, 2013    (CZ) ................. PV 2013-208

(51) Int. Cl.
*H02K 7/09* (2006.01)
*F16C 32/04* (2006.01)

(52) U.S. Cl.
CPC .......... *F16C 32/04* (2013.01); *F16C 32/0442* (2013.01); *F16C 32/0446* (2013.01); *F16C 2340/18* (2013.01)

(58) Field of Classification Search
CPC .......... H02K 7/09; H02K 29/08; H02K 11/21
USPC ..................... 310/68 B, 68 D, 90.5
See application file for complete search history.

(56) References Cited

U.S. PATENT DOCUMENTS

| 6,653,756 B2 * | 11/2003 | Ueyama ............... H02K 7/09 310/90.5 |
| 7,919,947 B2 | 4/2011 | Balboul ....................... 318/778 |
| 2002/0047400 A1 | 4/2002 | Ueyama et al. ............ 310/90.5 |

FOREIGN PATENT DOCUMENTS

| DE | 198 27 606 A1 | 12/1999 |
| JP | 11-166532 | 6/1999 |
| JP | 2002-130276 | 5/2002 |
| JP | 2006-22914 | 1/2006 |

(Continued)

OTHER PUBLICATIONS

Search Report dated Jul. 22, 2014 issued in corresponding European Patent Application No. EP 14 15 8475.

(Continued)

*Primary Examiner* — Thanh Lam
(74) *Attorney, Agent, or Firm* — Ostrolenk Faber LLP

(57) ABSTRACT

A method for correcting variations of parameters of components of an active magnetic bearing and/or assembly of active magnetic bearing as a whole, the active magnetic bearing includes a memory (M) to store values of production and/or electrical and/or installation variations of at least one component of the active magnetic bearing and/or variations of the whole active magnetic bearing assembly and/or correction values formed from the variations, the memory (M), a control system and/or detectors (D) of output signal of sensors (A) of the position and/or the evaluation circuits being interconnected or interconnectable.

8 Claims, 4 Drawing Sheets

(56) References Cited

FOREIGN PATENT DOCUMENTS

JP       2011-231760       11/2011
WO    WO 2008/080372 A1    7/2008

OTHER PUBLICATIONS

Search Report dated Dec. 11, 2013 issued in corresponding Czech Republic Patent Application No. PV 2013-208.

* cited by examiner

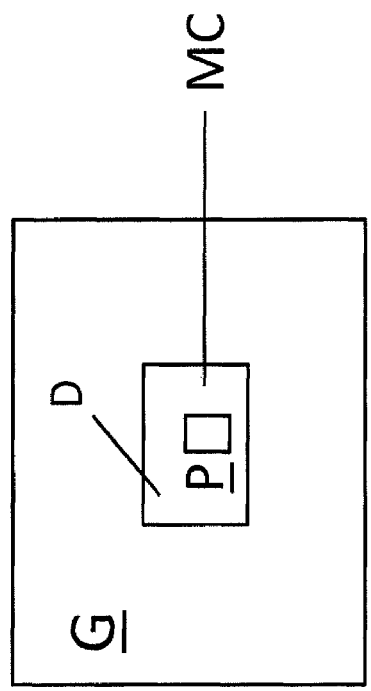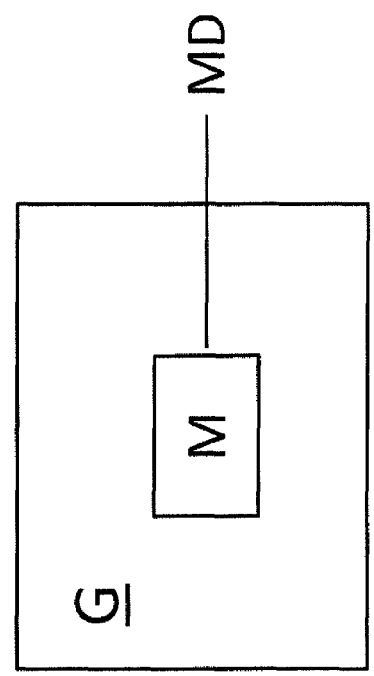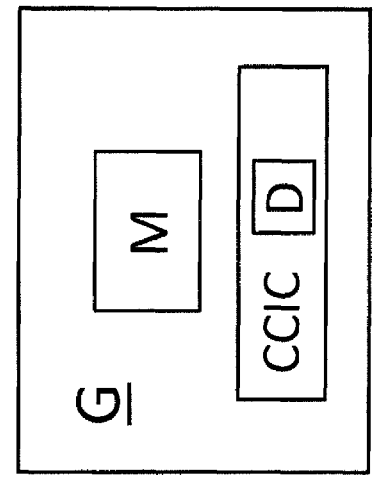

METHOD FOR CORRECTING VARIATIONS OF PARAMETERS OF COMPONENTS AND/OR OF ASSEMBLY OF ACTIVE MAGNETIC BEARING AND ACTIVE MAGNETIC BEARING FOR BEARING ROTATING WORKING MEANS

TECHNICAL FIELD

The invention relates to a method for correcting variations of parameters of components of an active magnetic bearing and/or of assembly of an active magnetic bearing as a whole.

The invention also relates to an active magnetic bearing for bearing a rotating working means which comprises in the basic body placed means of creating a magnetic field, in which a rotating working means is arranged and which further comprises sensors of position of the rotating working means, whereby, with each said sensor of position are aligned detector of its output signal and evaluation circuits.

BACKGROUND ART

For the purpose of bearing very fast-rotating working means, for example spinning rotors of open-end spinning machines, there are special devices which by means of controlled magnetic forces maintain the position of the rotating working means in the allotted space. Such devices are generally known as active magnetic bearings.

However, known embodiments of active magnetic bearings still present some drawbacks which consist particularly in the necessity of setting the parameters of each bearing individually, which is caused especially by certain production and/or electrical and/or operational and/or other tolerances of individual components, of which an active magnetic bearing is made up, as well as by mechanical tolerances during the installation of an active magnetic bearing. Nevertheless, neither tolerances of components, nor tolerances during installation can be excluded in cyclical production. These tolerances lead to the fact that although each component as such with its concrete parameters meets the required parameters including the allowed tolerances, different parts of the same component can already display various concrete parameters within the allowed tolerances, which in the whole relatively complicated system of an active magnetic bearing results in variability of the resulting properties and parameters of the whole active magnetic bearing assembly with a rotating working means. Therefore it is crucial, in order to ensure the right function of each active magnetic bearing, to carry out individual calibration of each active magnetic bearing and set the output parameters during its installation at the operating unit, where the active magnetic bearing serves to ensure the levitation, i.e. the function of the bearing of the rotating working means. Also, during servicing an operating unit, when one active magnetic bearing is replaced with another active magnetic bearing, it is necessary to carry out new individual calibration and set the output parameters of this newly introduced active magnetic bearing according to the specific conditions at a specific operating unit. By this individual calibration and setting during the installation of the "new" active magnetic bearing at a particular operating unit mechanical and/or electrical and/or operational and/or other variations of individual components of the active magnetic bearing or the active magnetic bearing as a whole are amended. Without this calibration and setting during the installation of the active magnetic bearing at an operating unit the active magnetic bearing could hardly fulfill its function, since electrical and electronic means of this operating unit and/or a section and/or the whole device (machine) would not be able to operate the active magnetic bearing properly, as well as control the rotation and position of the rotating working means properly.

The goal of the invention is to eliminate or at least reduce the drawbacks of the background art, namely to eliminate or at least reduce or simplify the necessity of individual setting of the parameters of each bearing at each operating unit separately during the installation of an active magnetic bearing at an operating unit.

SUMMARY OF THE INVENTION

The aim of the invention is achieved by a method for correcting variations of parameters of components of an active magnetic bearing and/or of assembly of an active magnetic bearing as a whole, whose principle consists in that at the latest before starting to operate an active magnetic bearing are detected mechanical and/or electrical and/or installation and/or other variations of parameters of at least one component of an active magnetic bearing and/or of the whole active magnetic bearing assembly, whereupon the detected variations and/or correction values determined from the variations are recorded in memory, which is part of the active magnetic bearing assembly, and subsequently these variations and/or correction values are used from the memory (M) for adjustment of the system for detecting position of the rotating working means in the active magnetic bearing during operation of the active magnetic bearing.

The aim of the invention is also achieved by an active magnetic bearing for bearing a rotating working means, whose principle consists in that in the active magnetic bearing assembly there is arranged a memory (M), in which are stored values of production and/or electrical and/or installation variations of at least one component of an active magnetic bearing and/or variations of the whole active magnetic bearing assembly and/or in the memory (M) are stored correction values formed from said variations, whereby the memory (M), the control system and/or the detectors of the output signal of the sensors of the position and/or the evaluation circuits are interconnected or interconnectable.

The advantage of this solution in comparison to the background art is producing and operating active magnetic bearing assemblies as whole systems, which in relation to other parts of the machine in which an active magnetic bearings is used appear identical in view of working parameters, without the necessity of setting each active magnetic bearing assembly specially according to a particular operating unit and other parts of the whole machine. Thus, throughout the whole service life, each active magnetic bearing contains inside or on the outside data that are needed for its proper operation without special setting and calibration during installation at a particular operating unit.

BRIEF DESCRIPTION OF DRAWINGS

The invention is schematically represented in the enclosed drawings, where

FIG. 6A depicts a generator with an analog potentiometer.

FIG. 6B depicts a generator with a monolithic digital potentiometer.

FIG. 6C depicts a generator according to another variation.

DESCRIPTION OF PREFERRED EMBODIMENTS

The invention will become more apparent from the following description of an example of embodiment of an active magnetic bearing for bearing the spinning rotor of an open-end spinning machine, in which the spinning rotor is a rotating working means.

An open-end spinning machine comprises at least one row of operating units situated next to each other. Apart from a number of other components, each operating unit comprises also a spinning unit 0, in which, apart from a number of other components, is arranged an active magnetic bearing, in which a spinning rotor 1 is rotatably mounted. The active magnetic bearing ensures maintaining the position of the spinning rotor 1 in the bearing in relation to the other parts of the bearing, e.g. by means of the illustrated electromagnetic stabilization system 13. A driving system 12 is provided to ensure the rotation of the spinning rotor 1.

Figure 1:
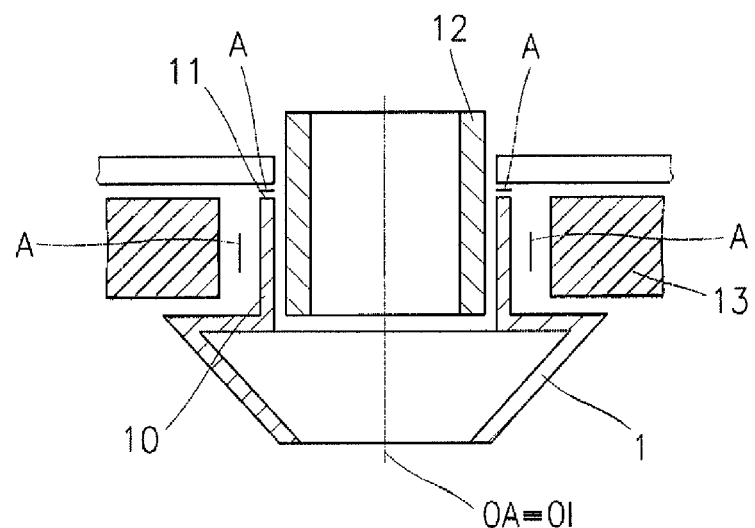
FIG. 1 shows an example of arrangement of essential parts of an active magnetic bearing with sensors of the position of a shaftless spinning rotor of an open-end spinning machine.

In the embodiment in FIG. 1 a two-sided open shaftless spinning rotor is illustrated, a one-sided open shaftless spinning rotor being analogical.

Figure 2:
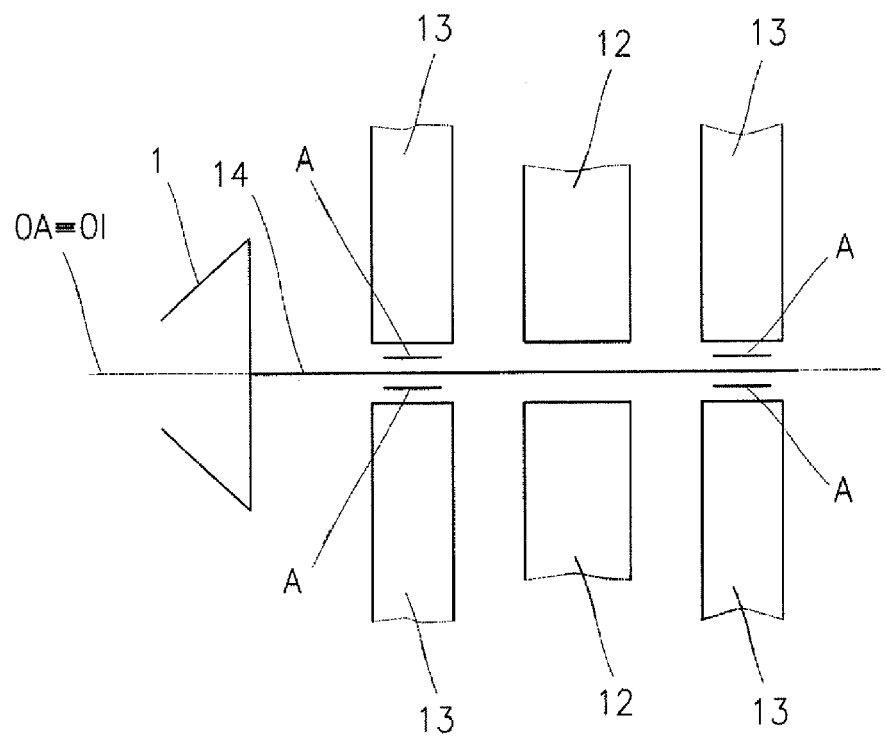
FIG. 2 represents an example of arrangement of essential parts of an active magnetic bearing with sensors of the position of a shaft spinning rotor.

In the embodiment in FIG. 2 the spinning rotor 1 is mounted on a shaft 14, which is arranged in an active magnetic bearing comprising a pair of electromagnetic stabilization systems 13 and one driving system 12, whose rotor is composed of the shaft 14 itself.

By the position of the spinning rotor 1 we understand placing the spinning rotor 1 in a three-dimensional coordinate system, including the position of the current rotation axis OA of the spinning rotor 1, i.e. the actual rotation axis of the spinning rotor 1, in relation to the theoretical rotation axis OI of the spinning rotor 1, which is determined by the geometry of the active magnetic bearing, the spinning unit and of the spinning rotor 1. The position of the spinning rotor 1 in the active magnetic bearing, or the position of the current axis OA in relation to the theoretical rotation axis, is detected by the system of detecting the position of the spinning rotor 1 in the active magnetic bearing.

Figure 3:
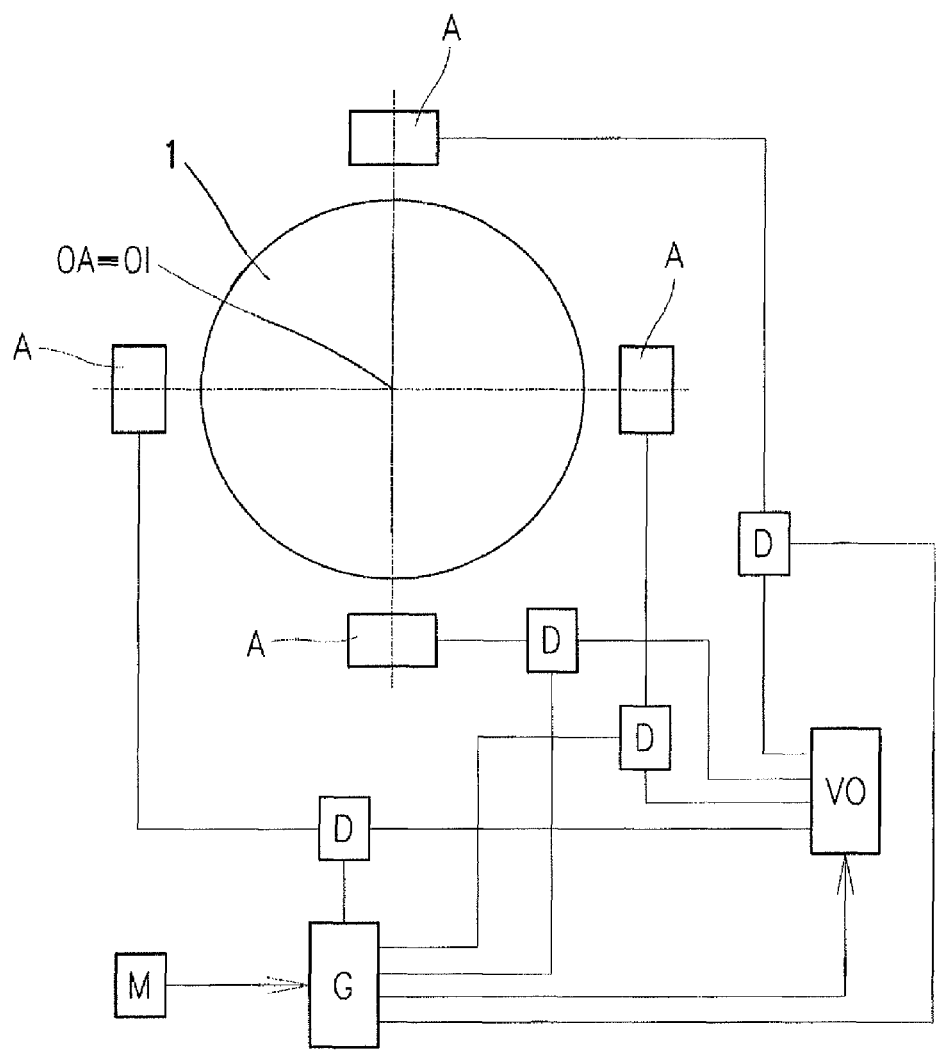
FIG. 3 shows an example of embodiment of arrangement and connection of the sensors of the spinning rotor position.
Figure 4:
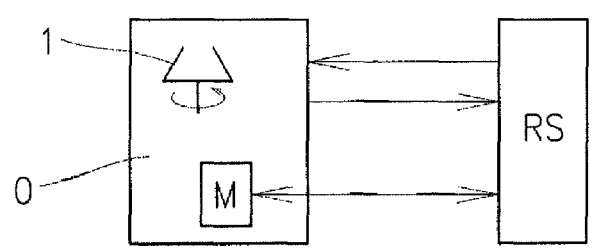
FIG. 4 represents a flow chart of the arrangement and control of an active magnetic bearing by a control system which is not part of an active magnetic bearing assembly and FIG. 5 provides a flow chart of generating a correction signal for the detectors of output signals of the sensors of the spinning rotor position.
Figure 5:
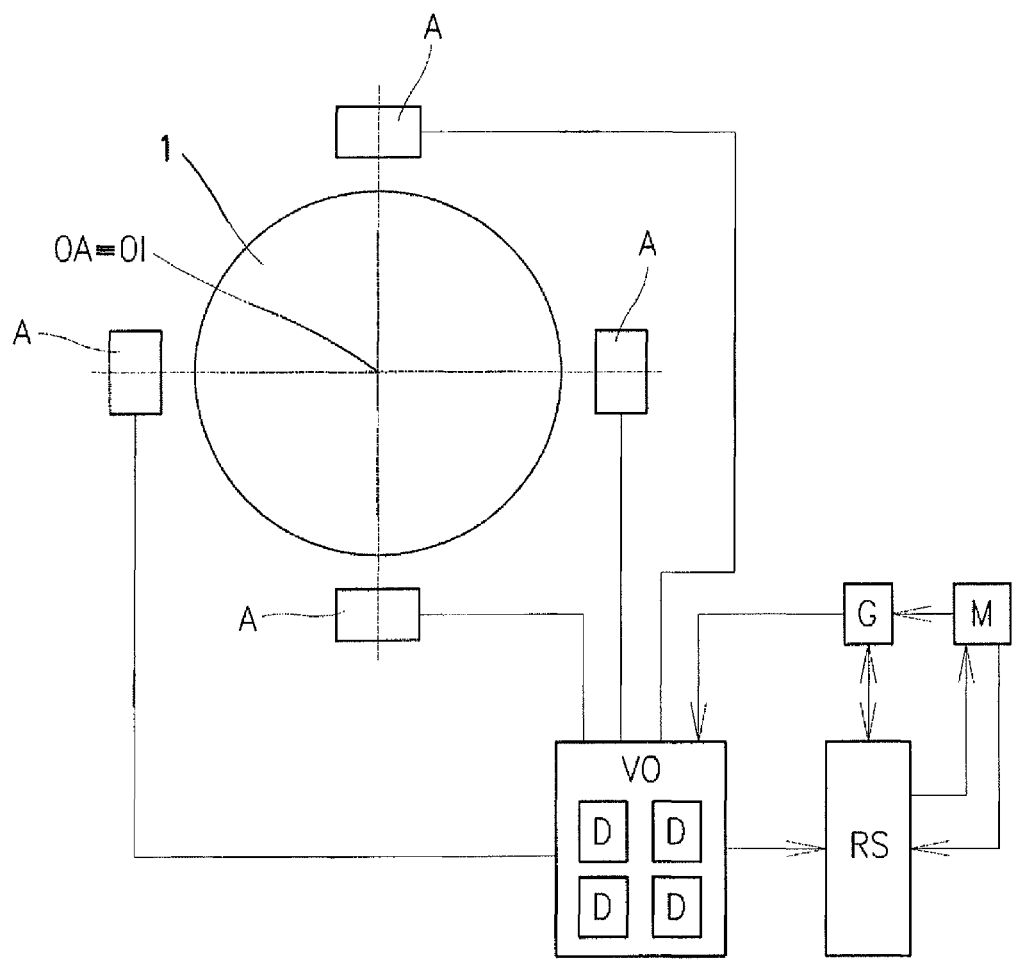

The system of detecting the position of the spinning rotor 1 comprises sensors A of the position of the spinning rotor 1, which are coupled with detectors D of output signals of the position sensors A and also with evaluation circuits VO, as well as with the control system RS, which is either part of the active magnetic bearing assembly or is not part of it. The sensors A of the position of the spinning rotor 1 serve either to register radial shifting of the spinning rotor 1, i.e. radial shifting of the current rotation axis OA of the spinning rotor 1 with respect to the theoretical rotation axis OI of the spinning rotor 1, and/or serve to register the inclination of the spinning rotor 1, i.e. the inclination of the current rotation axis OA of the spinning rotor 1 with respect to the theoretical rotation axis OI of the spinning rotor 1. FIG. 1 shows the position sensors A for registering radial shifting, as well as the inclination of the spinning rotor 1, in which the sensors A are situated both opposite the cylindrical wall of the spinning rotor 1, and opposite the wall of the spinning rotor 1, which is perpendicular to the rotation axis OA, OI of the spinning rotor 1. FIGS. 3 and 5 show the position sensors A for registering radial shifting of the spinning rotor 1 when the position sensors A are arranged opposite the cylindrical wall of the spinning rotor 1.

In an example of embodiment the position sensors A are designed as high frequency transformers with a pair of coils on a common printed circuit board and are at the input stage actuated by a high frequency actuating signal having a frequency in the order of at least tens of MHz, typically having a frequency from tens MHz to hundreds of MHz, especially frequencies from 20 MHz and above. The output signal A of the position is processed by connected detectors D, whose output signal is further used for detecting the position of the spinning rotor 1 in the active magnetic bearing.

The process of correcting the mechanical and/or electrical and/or operational and/or other variations of the used components, i.e. mechanical and/or electrical and/or operational and/or other variations caused by the tolerance of the components, inaccuracies in production and/or other influences, is carried out in such a manner that during the production of an active magnetic bearing assembly, e.g. during its calibration, but at the latest before using the given active magnetic bearing assembly for the first time at an operating unit, individual parameters and/or variations of parameters of at least some currently used components of which an active magnetic bearing is made up and/or the parameters or variations from the parameters of the whole active magnetic bearing assembly are detected, and these parameters and/or their variations are either directly and/or in the form of correction values based on the detected reflections recorded in the memory M, which is part of the active magnetic bearing assembly. These variations and/or correction values are subsequently obtained during the operation of the active magnetic bearing from the memory M and are used for the adjustment to the system of detecting the position of the rotating working means in the active magnetic bearing, i.e. for the detection and evaluation of the output signals of the sensors A of the position of the spinning rotor 1 and/or for controlling the active magnetic bearing with respect to detecting the position of the spinning rotor 1 as the rotating working means and performing the stabilization of the position of the rotating working means in the active magnetic bearing.

The process of adjustment to the system of detecting the position of the rotating working means in the active magnetic bearing is carried out either by generating a correction signal in the generator G, from which the correction signal is supplied directly to the system of the active magnetic bearing, e.g. by means of various analog and digital means, i.e. means (generators G) with an analog or digital output signal, or supplied to the system of detecting the position of the rotating working means in the active magnetic bearing, to the evaluation circuits, to the detectors D etc. The adjustment to the system of detecting the position of the rotating working means in the active magnetic bearing is in accordance with other examples of embodiment carried out by translation or calculation, e.g. by digital translation or calculation performed in the control system RS of the active magnetic bearing from the values determined by the system of detecting the position of the rotating working means in the active magnetic bearing and from the data obtained from the memory M. Furthermore, the control system RS is either an integral part of the active magnetic bearing assembly or it is external.

The memory M for storing correction values, whether it is digital, analog or another type of memory M, it is for the purpose of safety, as well as for practical reasons, inseparably connected with the active magnetic bearing assembly, whether it is connected with the electrical or electronic circuits of the active magnetic bearing or whether it is connected with the mechanical system of the active magnetic bearing, such as a frame, a printed circuit board, etc. The memory M can be made up of paper or a plastic label containing information for the manual setting of the acting element of the active magnetic bearing generating a correction signal by means of the generator G with an analog or digital output signal, e.g. an analog potentiometer P connected in the circuit of the detector D, in which the memory is realized as an angle of mechanical setting (turning) of the control means MC, or as a digital potentiometer etc. The memory M can also be an integral part of a suitably selected generator G, e.g. it can be a memory Flash or EEPROM of a monolithic digital potentiometer MD, e.g. MCP4361 made by the company Microchip etc. The generator G with the memory M can also be composed of other digital means or other digitally programmable means, it can be composed of a customer centered integrated circuit CCIC, which can also comprise detectors D, etc. These digital or digitally programmable means are then preferably an integral part of the active magnetic bearing as a whole. From the point of view of production and optimalization of parameters it is advantageous if at least a part of the above mentioned electronic elements is included in at least one customer centered integrated circuit. In the case of electrical type of the memory M it is advantageous if such memory M is created on a common printed circuit board with other electrical elements or circuits, such as sensors A of the position of the spinning rotor 1 and detectors D of their output signals and consecutive electronics. Thus each produced active magnetic bearing as a whole contains during its whole existence accurately recorded data for generating correction signals for correcting all types of variations for the particular components used for the production of each particular active magnetic bearing assembly. If this particular active magnetic bearing assembly is replaced at an operating unit, e.g. of a textile machine, with another particular active magnetic bearing assembly, it is then possible to set this new active magnetic bearing assembly for the particular operating unit very quickly, easily and reliably.

What is claimed is:

1. An active magnetic bearing for bearing a rotating working means which comprises in the basic body placed means of creating a magnetic field, in which the rotating working means is arranged and which further comprises sensors of position of the rotating working means, whereby, with each said sensor of position are aligned detector of its output signal and evaluation circuits, wherein in the active magnetic bearing assembly is equipped with a memory, in which are stored permanent values of production and/or electrical and/or installation variations of at least one component of the active magnetic bearing and/or variations of the whole active magnetic bearing assembly are permanently stored and/or in the memory are permanently stored correction values formed from said variations, whereby the memory, the control system and/or the detectors of the output signal of the sensors of the position and/or the evaluation circuits are interconnected or interconnectable.

2. An active magnetic bearing according to claim 1, wherein the memory is connected with least one generator of correction signal.

3. An active magnetic bearing according to claim 2, wherein the generator of correction signal comprises an analog component with an analog output signal.

4. An active magnetic bearing according to claim 3, wherein the generator with an analog output signal comprises an analog potentiometer with a mechanic control means and memory is created by angle of mechanical setting of the mechanic control means.

5. An active magnetic bearing according to claim 3, wherein the generator with an analog output signal comprises one or several monolithic digital potentiometers, each with their own Flash or EEPROM memory, which constitutes the memory.

6. An active magnetic bearing according to claim 2, wherein the generator of correction signal is composed of a generator with digital output signal.

7. An active magnetic bearing according to claim 2, wherein the generator of correction signal and detectors of output signal of the position sensors are part of at least one custom integrated circuit with said memory.

8. An active magnetic bearing according to claim 1, wherein the memory is connected with control system, the control system is provided with means of digital calculating of adjustment of the system for detecting position of the rotating working means according to the variations and/or correction values stored in the memory and the data of the system for detecting the position of the rotating working means.

* * * * *